(12) United States Patent
Hakkani-Tur et al.

(10) Patent No.: US 10,061,843 B2
(45) Date of Patent: Aug. 28, 2018

(54) TRANSLATING NATURAL LANGUAGE UTTERANCES TO KEYWORD SEARCH QUERIES

(71) Applicant: Microsoft Technology Licensing, LLC, Redmond, WA (US)

(72) Inventors: Dilek Zeynep Hakkani-Tur, Los Altos, CA (US); Gokhan Tur, Los Altos, CA (US); Rukmini Iyer, Los Altos, CA (US); Larry Paul Heck, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/733,188

(22) Filed: Jun. 8, 2015

(65) Prior Publication Data
US 2016/0004707 A1    Jan. 7, 2016

Related U.S. Application Data

(63) Continuation of application No. 13/592,638, filed on Aug. 23, 2012, now Pat. No. 9,064,006.

(51) Int. Cl.
*G06F 17/30* (2006.01)
*G06F 17/28* (2006.01)
*G06N 99/00* (2010.01)

(52) U.S. Cl.
CPC ...... *G06F 17/3066* (2013.01); *G06F 17/2818* (2013.01); *G06F 17/3043* (2013.01); *G06F 17/30654* (2013.01); *G06F 17/30663* (2013.01); *G06F 17/30672* (2013.01); *G06F 17/30684* (2013.01); *G06F 17/30864* (2013.01); *G06F 17/30914* (2013.01); *G06N 99/005* (2013.01)

(58) Field of Classification Search
CPC combination set(s) only.
See application file for complete search history.

(56) References Cited

U.S. PATENT DOCUMENTS

| | | | |
|---|---|---|---|
| 4,560,977 A | 12/1985 | Murakami et al. |
| 4,688,195 A | 8/1987 | Thompson |
| 4,727,354 A | 2/1988 | Lindsay |
| 4,772,946 A | 9/1988 | Hammer |
| 4,811,398 A | 3/1989 | Copperi et al. |
| 4,868,750 A | 9/1989 | Kucera et al. |

(Continued)

FOREIGN PATENT DOCUMENTS

| | | |
|---|---|---|
| CN | 1313972 A | 9/2001 |
| CN | 1325527 A | 12/2001 |

(Continued)

OTHER PUBLICATIONS

Chinese Office Action in Application 201210087420.9, dated May 5, 2016, 18 pgs.

(Continued)

*Primary Examiner* — Etienne Leroux

(57) ABSTRACT

Natural language query translation may be provided. A statistical model may be trained to detect domains according to a plurality of query click log data. Upon receiving a natural language query, the statistical model may be used to translate the natural language query into an action. The action may then be performed and at least one result associated with performing the action may be provided.

20 Claims, 7 Drawing Sheets

(56) References Cited

U.S. PATENT DOCUMENTS

| | | | |
|---|---|---|---|
| 4,969,192 A | 11/1990 | Chen et al. |
| 5,146,406 A | 9/1992 | Jensen |
| 5,259,766 A | 11/1993 | Sack |
| 5,265,014 A | 11/1993 | Haddock et al. |
| 5,299,125 A | 3/1994 | Baker |
| 5,325,298 A | 6/1994 | Gallant |
| 5,418,948 A | 5/1995 | Turtle |
| 5,600,765 A | 2/1997 | Ando et al. |
| 5,680,628 A | 10/1997 | Carus et al. |
| 5,694,559 A | 12/1997 | Hobson et al. |
| 5,737,734 A | 4/1998 | Schultz |
| 5,748,974 A | 5/1998 | Johnson |
| 5,794,050 A | 8/1998 | Dahlgren et al. |
| 5,819,260 A | 10/1998 | Lu et al. |
| 5,861,886 A | 1/1999 | Moran et al. |
| 5,880,743 A | 3/1999 | Moran et al. |
| 5,895,464 A | 4/1999 | Bhandari et al. |
| 5,930,746 A | 7/1999 | Ting |
| 5,970,446 A | 10/1999 | Goldberg et al. |
| 6,212,494 B1 | 4/2001 | Boguraev |
| 6,222,465 B1 | 4/2001 | Kumar et al. |
| 6,246,981 B1 | 6/2001 | Papineni et al. |
| 6,256,033 B1 | 7/2001 | Nguyen |
| 6,397,179 B2 | 5/2002 | Crespo et al. |
| 6,401,086 B1 | 6/2002 | Bruckner |
| 6,411,725 B1 | 6/2002 | Rhoads |
| 6,441,725 B1 | 6/2002 | Rhoads |
| 6,512,838 B1 | 1/2003 | Rafii et al. |
| 6,539,931 B2 | 4/2003 | Trajkovic et al. |
| 6,553,345 B1 | 4/2003 | Kuhn et al. |
| 6,601,026 B2 | 7/2003 | Appelt et al. |
| 6,658,377 B1 | 12/2003 | Anward et al. |
| 6,665,640 B1 | 12/2003 | Bennett et al. |
| 6,674,877 B1 | 1/2004 | Jojic et al. |
| 6,895,083 B1 | 5/2005 | Bers et al. |
| 6,950,534 B2 | 9/2005 | Cohen et al. |
| 6,970,947 B2 | 11/2005 | Ebling et al. |
| 6,990,639 B2 | 1/2006 | Wilson |
| 6,999,932 B1 | 2/2006 | Zhou |
| 7,050,977 B1 | 5/2006 | Bennett |
| 7,100,082 B2 | 8/2006 | Little |
| 7,227,526 B2 | 6/2007 | Hildreth et al. |
| 7,231,609 B2 | 6/2007 | Baudish |
| 7,251,781 B2 | 7/2007 | Batchilo et al. |
| 7,272,601 B1 | 9/2007 | Wang et al. |
| 7,308,112 B2 | 12/2007 | Fujimura et al. |
| 7,317,836 B2 | 1/2008 | Fujimura et al. |
| 7,328,216 B2 | 2/2008 | Hofmann et al. |
| 7,366,655 B1 | 4/2008 | Gupta |
| 7,367,887 B2 | 5/2008 | Watabe et al. |
| 7,519,223 B2 | 4/2009 | Dehlin et al. |
| 7,590,262 B2 | 9/2009 | Fujimura et al. |
| 7,596,767 B2 | 9/2009 | Wilson |
| 7,606,700 B2 | 10/2009 | Ramsey et al. |
| 7,617,200 B2 | 11/2009 | Budzik |
| 7,640,164 B2 | 12/2009 | Sasaki et al. |
| 7,665,041 B2 | 2/2010 | Wilson et al. |
| 7,672,845 B2 | 3/2010 | Beranek et al. |
| 7,704,135 B2 | 4/2010 | Harrison, Jr. |
| 7,716,056 B2 | 5/2010 | Weng et al. |
| 7,720,674 B2 | 5/2010 | Kaiser et al. |
| 7,720,856 B2 | 5/2010 | Godecke et al. |
| 7,747,438 B2 | 6/2010 | Nguyen et al. |
| 7,756,708 B2 | 7/2010 | Cohen et al. |
| 7,797,303 B2 | 9/2010 | Roulland et al. |
| 7,822,597 B2 | 10/2010 | Brun |
| 7,869,998 B1 | 1/2011 | Di Fabbrizio |
| 7,890,500 B2 | 2/2011 | Bobrow et al. |
| 7,890,539 B2 | 2/2011 | Boschee et al. |
| 8,000,453 B2 | 8/2011 | Cooper et al. |
| 8,019,610 B2 | 9/2011 | Walker |
| 8,108,208 B2 | 1/2012 | Makela |
| 8,117,635 B2 | 2/2012 | Hendricks |
| 8,140,556 B2 | 3/2012 | Rao et al. |
| 8,144,840 B2 | 3/2012 | Luehrig et al. |
| 8,155,962 B2 | 4/2012 | Kennewick et al. |
| 8,165,886 B1 | 4/2012 | Gagnon |
| 8,180,629 B2 | 5/2012 | Rehberg |
| 8,260,817 B2 | 9/2012 | Boschee et al. |
| 8,265,925 B2 | 9/2012 | Aarskog |
| 8,317,518 B2 | 11/2012 | Jarrell |
| 8,335,754 B2 | 12/2012 | Dawson et al. |
| 8,380,489 B1 | 2/2013 | Zhang |
| 8,448,083 B1 | 5/2013 | Migos |
| 8,489,115 B2 | 7/2013 | Rodriguez et al. |
| 8,521,766 B1 | 8/2013 | Hoarty |
| 8,595,222 B2 | 11/2013 | Dean |
| 8,595,642 B1 | 11/2013 | Lagassey |
| 8,600,747 B2 | 12/2013 | Abella et al. |
| 8,612,208 B2 | 12/2013 | Cooper et al. |
| 8,612,747 B2 | 12/2013 | Roskind |
| 8,762,358 B2 | 6/2014 | Datta et al. |
| 8,825,661 B2 | 9/2014 | Joski et al. |
| 9,064,006 B2 | 6/2015 | Hakkani-Tur et al. |
| 9,082,402 B2 | 7/2015 | Yadgar |
| 9,123,341 B2 | 9/2015 | Weng |
| 9,197,736 B2 | 11/2015 | Davis |
| 92,744,984 | 1/2016 | Heck et al. |
| 9,318,108 B2 | 4/2016 | Gruber |
| 9,497,499 B2 | 11/2016 | Chang et al. |
| 9,812,120 B2 | 11/2017 | Takatsuka |
| 2001/0020954 A1 | 9/2001 | Hull |
| 2001/0053968 A1 | 12/2001 | Galitsky |
| 2002/0059069 A1* | 5/2002 | Hsu ............ G10L 15/18 704/257 |
| 2002/0165860 A1 | 11/2002 | Glover |
| 2003/0125955 A1 | 7/2003 | Arnold et al. |
| 2003/0137537 A1 | 7/2003 | Guo et al. |
| 2003/0236099 A1 | 12/2003 | Deisher et al. |
| 2004/0078725 A1 | 4/2004 | Little |
| 2004/0083092 A1 | 4/2004 | Valles |
| 2004/0117189 A1 | 6/2004 | Bennett |
| 2004/0122674 A1* | 6/2004 | Bangalore ............ G06F 3/0481 704/276 |
| 2004/0172460 A1 | 9/2004 | Marel et al. |
| 2004/0189720 A1 | 9/2004 | Wilson et al. |
| 2004/0193420 A1 | 9/2004 | Kennewick et al. |
| 2004/0220797 A1 | 11/2004 | Wang et al. |
| 2004/0225499 A1 | 11/2004 | Wang et al. |
| 2005/0033582 A1 | 2/2005 | Gadd et al. |
| 2005/0074140 A1 | 4/2005 | Grasso et al. |
| 2005/0270293 A1 | 12/2005 | Guo et al. |
| 2005/0271864 A1 | 12/2005 | Hudson |
| 2005/0278164 A1 | 12/2005 | Hudson et al. |
| 2005/0289124 A1 | 12/2005 | Kaiser et al. |
| 2006/0036430 A1 | 2/2006 | Hu |
| 2006/0074631 A1 | 4/2006 | Wang et al. |
| 2006/0074883 A1 | 4/2006 | Teevan et al. |
| 2006/0080101 A1 | 4/2006 | Chotimongkol et al. |
| 2006/0136375 A1 | 6/2006 | Cox |
| 2006/0173868 A1 | 8/2006 | Angele et al. |
| 2006/0206306 A1 | 9/2006 | Cao |
| 2006/0206333 A1 | 9/2006 | Paek et al. |
| 2006/0206336 A1 | 9/2006 | Gurram et al. |
| 2006/0206454 A1 | 9/2006 | Forstall et al. |
| 2006/0235689 A1 | 10/2006 | Sugihara |
| 2006/0271353 A1 | 11/2006 | Berkan |
| 2006/0271356 A1 | 11/2006 | Vos |
| 2006/0271520 A1 | 11/2006 | Ragan |
| 2006/0293874 A1 | 12/2006 | Zhang et al. |
| 2007/0005363 A1 | 1/2007 | Cucerzan et al. |
| 2007/0038436 A1 | 2/2007 | Cristo et al. |
| 2007/0071209 A1 | 3/2007 | Horvitz et al. |
| 2007/0100624 A1 | 5/2007 | Weng et al. |
| 2007/0106497 A1 | 5/2007 | Ramsey et al. |
| 2007/0118357 A1 | 5/2007 | Kasravi et al. |
| 2007/0124134 A1 | 5/2007 | Van Kommer |
| 2007/0124263 A1 | 5/2007 | Katariya et al. |
| 2007/0136068 A1 | 6/2007 | Horvitz |
| 2007/0136222 A1 | 6/2007 | Horvitz |
| 2007/0143155 A1 | 6/2007 | Whitsett et al. |
| 2007/0299799 A1 | 12/2007 | Meehan et al. |
| 2008/0005068 A1 | 1/2008 | Dumais et al. |
| 2008/0040114 A1 | 2/2008 | Zhou et al. |

(56) References Cited

U.S. PATENT DOCUMENTS

| | | |
|---|---|---|
| 2008/0040510 A1 | 2/2008 | Warner et al. |
| 2008/0080678 A1 | 4/2008 | Ma et al. |
| 2008/0082518 A1 | 4/2008 | Loftesness |
| 2008/0097951 A1 | 4/2008 | Gupta et al. |
| 2008/0140389 A1 | 6/2008 | Funakoshi |
| 2008/0140657 A1 | 6/2008 | Azvine et al. |
| 2008/0152191 A1 | 6/2008 | Fujimura et al. |
| 2008/0167876 A1 | 7/2008 | Bakis et al. |
| 2008/0168037 A1 | 7/2008 | Kapadia et al. |
| 2008/0172359 A1 | 7/2008 | Lundell et al. |
| 2008/0201280 A1 | 8/2008 | Martin et al. |
| 2008/0201434 A1 | 8/2008 | Holmes et al. |
| 2008/0221870 A1 | 9/2008 | Attardi et al. |
| 2008/0228467 A1 | 9/2008 | Womack et al. |
| 2008/0231926 A1 | 9/2008 | Klug et al. |
| 2008/0235199 A1 | 9/2008 | Li et al. |
| 2008/0300871 A1 | 12/2008 | Gilbert |
| 2008/0306934 A1 | 12/2008 | Craswell et al. |
| 2008/0319944 A1 | 12/2008 | Venolia |
| 2008/0319962 A1 | 12/2008 | Riezler et al. |
| 2009/0006333 A1 | 1/2009 | Jones et al. |
| 2009/0006345 A1 | 1/2009 | Platt et al. |
| 2009/0006389 A1 | 1/2009 | Piscitello et al. |
| 2009/0012778 A1 | 1/2009 | Feng |
| 2009/0012842 A1 | 1/2009 | Srinivasan et al. |
| 2009/0027337 A1 | 1/2009 | Hildreth |
| 2009/0055380 A1 | 2/2009 | Peng et al. |
| 2009/0076917 A1 | 3/2009 | Jablokov et al. |
| 2009/0077047 A1 | 3/2009 | Cooper et al. |
| 2009/0079813 A1 | 3/2009 | Hildreth |
| 2009/0089126 A1 | 4/2009 | Odubiyi |
| 2009/0094036 A1 | 4/2009 | Ehlen et al. |
| 2009/0112596 A1 | 4/2009 | Syrdal et al. |
| 2009/0112782 A1 | 4/2009 | Cross et al. |
| 2009/0141933 A1 | 6/2009 | Wagg |
| 2009/0177645 A1 | 7/2009 | Heck |
| 2009/0221368 A1 | 9/2009 | Yen et al. |
| 2009/0232288 A1 | 9/2009 | Forbes et al. |
| 2009/0234655 A1 | 9/2009 | Kwon |
| 2009/0248422 A1 | 10/2009 | Li et al. |
| 2009/0248659 A1 | 10/2009 | McCool et al. |
| 2009/0281789 A1 | 11/2009 | Waibel et al. |
| 2009/0292687 A1 | 11/2009 | Fan et al. |
| 2009/0315740 A1 | 12/2009 | Hildreth et al. |
| 2010/0023320 A1 | 1/2010 | DiCristo et al. |
| 2010/0023331 A1 | 1/2010 | Duta et al. |
| 2010/0036717 A1 | 2/2010 | Trest |
| 2010/0036831 A1 | 2/2010 | Vemuri |
| 2010/0057463 A1 | 3/2010 | Weng et al. |
| 2010/0057801 A1 | 3/2010 | Ramer et al. |
| 2010/0082610 A1* | 4/2010 | Anick ............... G06F 17/30864 707/723 |
| 2010/0093435 A1 | 4/2010 | Glaser et al. |
| 2010/0114574 A1 | 5/2010 | Liu et al. |
| 2010/0121639 A1 | 5/2010 | Meyer |
| 2010/0138215 A1 | 6/2010 | Williams |
| 2010/0138410 A1* | 6/2010 | Liu ................... G06F 17/30864 707/723 |
| 2010/0161642 A1 | 6/2010 | Chen |
| 2010/0169098 A1 | 7/2010 | Patch |
| 2010/0199227 A1 | 8/2010 | Xiao et al. |
| 2010/0205180 A1 | 8/2010 | Cooper et al. |
| 2010/0217604 A1 | 8/2010 | Baldwin et al. |
| 2010/0235341 A1 | 9/2010 | Bennett |
| 2010/0235375 A1 | 9/2010 | Sidhu et al. |
| 2010/0250518 A1 | 9/2010 | Bruno |
| 2010/0274796 A1 | 10/2010 | Beauregard et al. |
| 2010/0281435 A1 | 11/2010 | Bangalore et al. |
| 2010/0306591 A1 | 12/2010 | Krishna |
| 2010/0313125 A1 | 12/2010 | Fleizach |
| 2010/0318398 A1 | 12/2010 | Brun et al. |
| 2010/0318549 A1 | 12/2010 | Mayr |
| 2011/0016005 A1 | 1/2011 | Li et al. |
| 2011/0022992 A1 | 1/2011 | Zhou et al. |
| 2011/0040777 A1 | 2/2011 | Stefanov |
| 2011/0078159 A1 | 3/2011 | Li et al. |
| 2011/0082848 A1 | 4/2011 | Goldentouch |
| 2011/0099476 A1 | 4/2011 | Snook et al. |
| 2011/0105190 A1 | 5/2011 | Cha |
| 2011/0137943 A1 | 6/2011 | Asano |
| 2011/0144999 A1 | 6/2011 | Jang et al. |
| 2011/0219340 A1 | 9/2011 | Pathangay |
| 2011/0313768 A1 | 12/2011 | Klein et al. |
| 2011/0320470 A1 | 12/2011 | Williams et al. |
| 2011/0320945 A1 | 12/2011 | Wong |
| 2012/0030637 A1 | 2/2012 | Day et al. |
| 2012/0035924 A1 | 2/2012 | Jitkoff et al. |
| 2012/0059842 A1 | 3/2012 | Hille-Doering et al. |
| 2012/0078636 A1 | 3/2012 | Ferrucci |
| 2012/0130822 A1 | 5/2012 | Patwa et al. |
| 2012/0131073 A1 | 5/2012 | Olney |
| 2012/0136865 A1 | 5/2012 | Blom et al. |
| 2012/0166178 A1 | 6/2012 | Latzina |
| 2012/0197999 A1 | 8/2012 | Agarwal et al. |
| 2012/0216151 A1 | 8/2012 | Sarkar et al. |
| 2012/0233207 A1* | 9/2012 | Mohajer ........... G06F 17/30684 707/769 |
| 2012/0242586 A1 | 9/2012 | Krishnaswamy |
| 2012/0253788 A1 | 10/2012 | Heck et al. |
| 2012/0253789 A1 | 10/2012 | Heck et al. |
| 2012/0253790 A1 | 10/2012 | Heck et al. |
| 2012/0253791 A1 | 10/2012 | Heck et al. |
| 2012/0253793 A1 | 10/2012 | Ghannam et al. |
| 2012/0253802 A1 | 10/2012 | Heck et al. |
| 2012/0254227 A1 | 10/2012 | Heck et al. |
| 2012/0254810 A1 | 10/2012 | Heck et al. |
| 2012/0290290 A1 | 11/2012 | Tur et al. |
| 2012/0296643 A1 | 11/2012 | Kristjansson et al. |
| 2012/0316862 A1 | 12/2012 | Sultan et al. |
| 2012/0327009 A1 | 12/2012 | Fleizach |
| 2013/0013644 A1 | 1/2013 | Sathish et al. |
| 2013/0080472 A1* | 3/2013 | Cohen ............... G06F 17/30401 707/794 |
| 2013/0117022 A1 | 5/2013 | Chen et al. |
| 2013/0185081 A1 | 7/2013 | Cheyer et al. |
| 2013/0273976 A1 | 10/2013 | Rao et al. |
| 2014/0006012 A1 | 1/2014 | Zhou et al. |
| 2014/0059030 A1 | 2/2014 | Hakkani-Tur et al. |
| 2015/0127323 A1 | 5/2015 | Jacquet |
| 2015/0356418 A1 | 12/2015 | Yampolska et al. |
| 2016/0118046 A1 | 4/2016 | Heck et al. |
| 2016/0179807 A1 | 6/2016 | Kumar et al. |
| 2017/0011025 A1 | 1/2017 | Tur et al. |
| 2017/0075985 A1 | 3/2017 | Chakraborty et al. |
| 2018/0075151 A1 | 3/2018 | Heck |

FOREIGN PATENT DOCUMENTS

| | | |
|---|---|---|
| CN | 1692407 | 11/2005 |
| CN | 1963752 | 10/2006 |
| CN | 1845052 | 5/2007 |
| CN | 1983271 A | 6/2007 |
| CN | 101120341 | 2/2008 |
| CN | 101297355 A | 10/2008 |
| CN | 101499277 | 5/2011 |
| EP | 1335338 A2 | 8/2003 |
| EP | 1793318 | 6/2007 |
| JP | 08-235185 | 9/1996 |
| JP | 2001022779 | 1/2001 |
| JP | 2001125896 | 5/2001 |
| JP | 2001125592 | 12/2001 |
| JP | 2502-024285 | 1/2002 |
| JP | 2002-082748 | 3/2002 |
| JP | 2003-505712 | 2/2003 |
| JP | 2003-115951 | 4/2003 |
| JP | 2004212641 | 7/2004 |
| JP | 2004328181 | 11/2004 |
| JP | 2004341672 | 12/2004 |
| JP | 2005-043461 | 2/2005 |
| JP | 2006202159 | 6/2007 |
| JP | 2009205552 | 10/2008 |
| JP | 2009116733 | 5/2009 |
| JP | 2010-128665 | 6/2010 |
| JP | 2010519609 | 6/2010 |

(56) References Cited

FOREIGN PATENT DOCUMENTS

| | | |
|---|---|---|
| JP | 2010-145262 | 7/2010 |
| JP | 2010-230918 | 10/2010 |
| KR | 1020050032649 | 4/2005 |
| KR | 10-1007336 B1 | 1/2011 |
| KR | 10-2011-0066357 | 6/2011 |
| TW | 504624 B | 10/2002 |
| WO | WO 00/73900 A1 | 12/2000 |
| WO | WO 00/75808 A1 | 12/2000 |
| WO | 2006042028 | 6/2006 |
| WO | WO 2007/064482 A1 | 6/2007 |
| WO | WO 2008/049206 | 5/2008 |
| WO | 2008069519 A1 | 6/2008 |
| WO | 2009029905 | 5/2009 |
| WO | 2009059065 A1 | 5/2009 |

OTHER PUBLICATIONS

U.S. Appl. No. 13/077,303, Office Action dated May 3, 2016, 19 pgs.
U.S. Appl. No. 13/077,396, Office Action dated May 19, 2016, 36 pgs.
U.S. Appl. No. 13/106,374, Notice of Allowance dated May 13, 2016, 16 pgs.
U.S. Appl. No. 13/106,374, Notice of Allowance dated May 27, 2016, 2 pgs.
Japanese Office Action in Application 2014-502723, dated Apr. 27, 2016, 7 pages.
Japanese Office Action in Application 2014-502718, dated May 20, 2016, 9 pages.
Chinese Office Action in Application 201210093414.4, dated Jun. 3, 2016, 16 pages.
Chinese Office Action in Application 2012100911763, dated May 25, 2016, 14 pages.
Chinese Office Action in Application 201210090349, dated Jun. 15, 2016, 13 pages.
Brody, et al., Body language user interface (BLUI), http://adsabs.harvard.edu/abs/1998SPIE.3299..400B, accessed Aug. 17, 2009, 1 page.
Corominas, Aurora, "The Artist's Gesture. An initial approach to the cinematic representation of Vincent Van Gogh's pictorial practice", http://www.iua.upf.es/formats/formats3/cor_a.htm, accessed Aug. 17, 2009, 12 pgs.
Gao et al., "VS: Facial Sculpting in the Virtual World", International Conference on Computational Intelligence for Modeling Control and Automation, and International Conference on Intelligent Agents, Web Technologies and Internet Commerce (CINCA-IAWTIC'06), IEEE Computer Society, Aug. 17, 2009, 6 pgs.
"Qian et al., ""A Gesture-Driven Multimodal Interactive Dance System"", IEEE International Conference on Multimedia and Expo, Taipei, Jun. 2004, vol. 3,pp. 1579-1582."
Hauptmann, "Speech and Gestures for Graphic Image Manipulation", CHI'89 Proceedings, Department of Computer Science, Carnegie-Mellon University, Pittsburgh, Penn., May 1989, 20(SI), 241-245.
Shivappa et al., "Person Tracking with Audio-Visual Cues Using Iterative Decoding Framework", IEEE Fifth International Conference on Advanced Video and Signal Based Surveillance, AVSS '08, Santa Fe, MN, Sep. 1-3, 2008, pp. 260-267.
"U.S. Official Action dated May 10, 2012, in U.S. Appl. No. 12/604,526, 21 pgs."
U.S. Appl. No. 13/077,431, Office Action dated Jun. 29, 2016, 16 pgs.
Chinese Office Action in Application 201210090634.1, dated Jun. 30, 2016, 10 pgs.
Taiwan Notice of Allowance Issued in Patent Application No. 101105673, dated Mar. 2, 2016, 4 Pages.
Japanese Office Action in Application 2014-502721, dated Mar. 3, 2016, 10 pgs.
U.S. Appl. No. 13/077,233, Office Action dated Apr. 18, 2016, 36 pgs.
U.S. Appl. No. 13/077,303, Advisory Action dated Apr. 15, 2016, 3 pgs.
Notice of Allowance dated Dec. 18, 2015, in U.S. Appl. No. 13/077,455, 2 pgs.
Notice of Allowance dated Dec. 3, 2015, in U.S. Appl. No. 13/077,455, 2 pgs.
U.S. Patent Application entitled Augmented Conversational Understanding Agent, having U.S. Appl. No. 13/076,862, filed Mar. 31, 2011.
U.S. Patent Application entitled "Conversational Dialog Learning and Correction" having U.S. Appl. No. 13/077,233, filed Mar. 31, 2011.
U.S. Patent Application entitled "Personalization of Queries, Conversations, and Searches" having U.S. Appl. No. 13/077,303, filed Mar. 31, 2011.
U.S. Patent Application entitled "Combined Activation for Natural User Interface Systems" having U.S. Appl. No. 13/077,368, filed Mar. 31, 2011.
U.S. Patent Application entitled "Task Driven User Intents" having U.S. Appl. No. 13/077,396, filed Mar. 31, 2011.
U.S. Patent Application entitled "Augmented Conversational Understanding Architecture" having U.S. Appl. No. 13/077,431, filed Mar. 31, 2011.
U.S. Patent Application entitled "Location-Based Conversational Understanding" having U.S. Appl. No. 13/077,455, filed Mar. 31, 2011.
U.S. Patent Application entitled "Sentence Simplification for Spoken Language Understanding" having U.S. Appl. No. 13/106,374, filed May 12, 2011.
U.S. Patent Application entitled "Translating Natural Language Utterances to Keyword Search Queries" having U.S. Appl. No. 13/592,638, filed Aug. 23, 2012.
Senior, et al, article entitled "Augmenting Conversational Dialogue by Means of Latent Semantic Googling,"—Published Date: Oct. 4-6, 2005, Trento, Italy; http://www.hml.queensu.ca/files/po265-senior.pdf, 7 pgs.
Wang, et al, article entitled "Idea Expander: Agent-Augmented Online Brainstorming,"—Published Date: Feb. 6-10, 2010, Savannah, Georgia, http://research.microsoft.com/en-us/um/redmond/groups/connect/cscw_10/docs/p535.pdf, 2 pgs.
Lyons, et al, article entitled "Augmenting Conversations Using Dual-Purpose Speech,"—Published Date: 2004; College of Computing and GVU Center, Georgia Institute of Technology, Atlanta, Georgia; http://www.cc.gatech.edu/ccg/publications/dp-uist.pdf, 10 pgs.
Sherwani, et al, article entitled "VoicePedia: Towards Speech-based Access to Unstructured Information,"—Published Date: 2007, http://www.cs.cmu.edu/~jsherwan/pubs/voicepedia.pdf, 4 pgs.
Website: The Future of Voice Arrives—Published Date: Jan. 11, 2007.http://www.voicebox.com/technology, 2 pgs.
Mairesse, et al., article entitled "Learning to Personalize Spoken Generation for Dialogue Systems—Published Date: 2005,http://citeseerx.ist.psu.edu/viewdoc/download?doi=10.1.1.66.9988&rep=rep1&type=pdf", 4 pgs.
Nguyen, et al., article entitled "An Adaptive Plan Based Dialogue Agent: Integrating Learning into a BDI Architecture," Published Date: May 8-12 2006 at AAMASA '06 in Hakodate, Hokkaido, Japan. http://www.cse.unsw.edu.au/~wobcke/papers/adaptive-dialogue.pdf, 3 pgs.
Technical Whitepaper entitled "Speak With Me, Inc." Retrieved Date: Sep. 24, 2010; http://www.speakwithme.com/files/pdf/whitepaper.pdf, 11 pgs.
Castells, et al, article entitled "Scalable semantic personalized search of spoken and written contents on the Semantic Web, A", Published Date: 2005.http://webcache.googleusercontent.com/search?q=cache:http://ir.ii.uam.es/s5t/informes/TIN2005-06885.pdf, 12 pgs.
Marcialis, et al, article entitled "SEARCHY: An Agent to Personalize Search Results," Published Date: Jun. 20, 2008 at the IEEE Third International Conference on Internet and Web Applications

(56) References Cited

OTHER PUBLICATIONS and Services Conference. http://ieeexplore.ieee.org/stamp/stamp.jsp?tp=arnumber=4545664. 6 pgs.

Tomuro et al, article entitled "Personalized Search in Folksonomies with Ontological User Profiles," Retrieved Date: Sep. 30, 2010, http://facweb.cs.depaul.edu/noriko/papers/iis09.pdf, 14 pgs.

Mylonas et al, article entitled "Personalized information retrieval based on context and ontological knowledge," Retrieved Date: Sep. 30, 2010. Printed in the United Kingdom and Presented in the Knowledge Engineering Review, vol. 23:1, 73-100; 2007, Cambridge University Press, http://citeseerx.ist.psu.edu/viewdoc/download?doi=10.1.1.148.4272&rep=rep1&type=pdf, 28 pgs.

"Abstract entitled "Adding Intelligence to the Interface," Published Date: 1996 IEEE; http://www.hitl.washington.edu/publications/billinghurst/vrais96/", 12 pgs.

"Turunen et al article entitled "Multimodal Interaction with Speech and Physical Touch Interface in a Media Center Application," Presented and Published Oct. 29-31, 2009 at Ace 2009 in Athens, Greece. http://delivery.acm.org/10.1145/1700000/1690392/p19-turunen.pdf?key1=1690392&key2=5824375821&coll=GUIDE&dl=GUIDE&CFID=103676711&CFTOKEN=24231502", 8 pgs.

"Moustakas et al, article entitled "MASTER-PIECE: A Multimodal (Gesture+Speech) Interface for 3D Model Search and Retrieval Integrated in a Virtual Assembly Application," Presented and Published Jul. 18,-Aug. 12, 2005 at Enterface '05 in Mons, Belgium. http://www.enterface.net/enterface05/docs/results/reports/project7.pdf", 14 pgs.

Lee e al, article entitled "An Implementation of Multi-Modal Game Interface Based on PDAs," Published Date: Aug., 2007 at the IEEE Fifth International Conference on Software Engineering Research, Management and Applications., http://ieeexplore.ieee.org/stamp/stamp.jsp?tp=arnumber=4297013, 8 pgs.

Mark Billinghurst, article entitled "Put That Where? Voice and Gesture at the Graphics Interface," Published in the Nov. 1998 Computer Graphics. http://delivery.acm.org/10.1145/310000/307730/p60-billinghurst.pdf?key1=307730&key2=0278375821&coll=GUIDE&dl=GUIDE&CFID=103683245&CFTOKEN=90378528, 5 pgs.

Stegmann, et al, abstract entitled "Multimodal Interaction for Access to Media Content," Retrieved Date: Sep. 29, 2010. http://www.icin.biz/files/2008papers/Poster-08.pdf, 4 pgs.

Horiguchi et al, abstract entitled "GaChat: A chat system that displays online retrieval information in dialogue text," Published at the Workshop on Visual Interfaces to the Social and the Semantic Web Conference Feb. 8, 2009 in Sanibel Island, Florida. http://www.smart-ui.org/events/vissw2009/papers/VISSW2009-Horiguchi.pdf, 5 pgs.

Aye, et al, article entitled "Use of Ontologies for Bridging Semantic Gaps in Distant Communication," Published Date: 2008. http://ieeexplore.ieee.org/stamp/stamp.jsp?tp=&arnumber=4781725, 5 pgs.

Jebara et al, article entitled "Tracking Conversational Context for Machine Mediation of Human Discourse," Retrieved Date: Oct. 1, 2010. http://www.cs.columbia.edu/~jebara/papers/conversation.pdf, 3 pgs.

Power Point Presentation entitled "Spoken Language Understanding for Conversational Dialog Systems," Presented and published at the IEEE/ACL 2006 Workshop on Spoken Language Technology in Aruba, Dec. 10-13, 2006. http://www.slt2006.org/MichaelMcTear.ppt, 33 pgs.

Fabbrizio et al, abstract entitled "Bootstrapping Spoken Dialog Systems with Data Reuse," Retrieved Date: Oct. 12, 2010. http://www.sigdialorg/workshops/workshop5/proceedings/pdf/difab-brizio.pdf, 9 pgs.

Website: Siri: Your Personal Assistant for the Mobile Web—Published Date: Feb. 4, 2010. http://www.readwriteweb.com/archives/siri_your_personal_assistant_for_the_mobile_web.php, 3 pgs.

Abela, et al, abstract entitled "SemChat: Extracting Personal Information from Chat Conversations," Retrieved Date: Oct. 12, 2010. http://staffum.edu.mt/cabe2/supervising/undergraduate/overview/keith_cortis.pdf, 10 pgs.

Robert Brown, article entitled "Exploring New Speech Recognition and Synthesis APIs in Windows Vista," published in MSDN Magazine, Retrieved Date: Oct. 12, 2010. hitp://msdn.microsoft.com/en-us/magazine/cc163663.aspx, 11 pgs.

Lee, et al Abstract entitled "Simplification of Nomenclature Leads to an Ideal IL for Human Language Communication"—Published Date: Oct. 28, 1997, at the AMTA/SIG-IL First Workshop on Interlinguas, San Diego, CA., Oct. 28, 1997; pp. 71-72. Obtained at: http://www.mt-archive.info/AMTA-1997-Lee.pdf, 2 pgs.

Kuansan Wang, Abstract entitled "Semantics Synchronous Understanding for Robust Spoken Language Applications"—Published Date: 2003, pp. 640-645. Obtained at: http://research.microsoft.com/pubs/77494/2003-kuansan-asru.pdf, 6 pgs.

"Antoine, et al., Abstract entitled "Automatic Adaptive Understanding of Spoken Language by Cooperation of Syntactic Parsing and Semantic Priming"—Published Date: 1994. Obtained at: http://www-clips.imag.fr/geod/User/jean.caelen/Publis_fichiers/SyntaxeSemantique.pdf",5 pgs.

Tur, et al, Abstract entitled "Semi-Supervised Learning for Spoken Language Understanding Using Semantic Role Labeling"—Published Date: 2005, pp. 232-237. Obtained at: http://ieeexplore.ieee.org/stamp/stamp.jsp?arnumber=01566523, 6 pgs.

Finkel, et al, Abstract entitled "Incorporating Non-Local Information into Information Extraction Systems by Gibbs Sampling"—Published Date: Jan. 3, 2006. Obtained at: http://nlp.stanford.edu/~manning/papers/gibbscrf3.pdf, 8 pgs.

Wang, et al, Article entitled "An Introduction to the Statistical Spoken Language Understanding"—Published in the IEEE Signal Processing Magazine, vol. 22, No. 5, pp. 16-31; 2005. http://research.microsoft.com/pubs/75236/2005-Wang-Deng-Acero-SPM.pdf.

Gorin, et al, Abstract entitled "How May I Help You?" Published in Speech Communication 23, Feb. 14, 1997, Revised May 23, 1997; pp. 113-127. http://disi.unitn.it/~riccardi/papers/specom97.pdf, 14 pgs.

P. J. Price, Abstract entitled "Evaluation of Spoken Language Systems: The ATIS Domain". Obtained on May 12, 2011 from the following website: http://acl.ldc.upenn.edu/H/H90/H90-1020.pdf, 5 pgs.

Raymond, et al, Abstract entitled "Generative and Discriminative Algorithms for Spoken Language Understanding", Published Aug. 27-31, 2007 at the Interspeech 2007 Conference in Antwerp, Belgium; pp. 1605-1608, Obtain at: http://citeseerx.ist.psu.edu/viewdoc/download?doi=10.1.1.106.2105&rep=rep1&type=pdf, 4 pgs.

Jeong, et al, Abstract entitled "Exploiting Non-Local Features for Spoken Language Understanding" Published in the Proceedings of the Coling/Acl 2006 Main Conference Poster Sessions, pp. 412-419 in Sydney, Australia Jul., 2006. Obtain at: http://www.aclweb.org/anthology/P/P06/P06-2054.pdf, 8 pgs.

Moschitti, et al, Abstract entitled "Spoken Language Understanding with Kernels for Syntactic/ Semantic Structures" Published in the 2007 IEEE Proceedings, pp. 183-188. Obtained at: http://ieeexplore.ieee.org/stamp/stamp.jsp/?tp=&arnumber=4430106, 6 pgs.

Hakkani-Tur, et al Abstract entitled "Using Semantic and Syntactic Graphs for Call Classification" Published in the Proceedings of the ACL Workshop on Feature Engineering for Machine Learingin in NLP, pp. 24-31 in Ann Arbor, Michigan, Jun. 2005. Obtained at: http://citeseerx.ist.psu.edu/viewdoc/download?doi=10.1.1.59.8566&rep=rep1&type=pdf, 8 pgs.

Dowding, et al Article entitled "Gemini: A Natural Language System for Spoken Language Understanding" pp. 54-61. Obtained on May 12, 2011 at website: http://acl.ldc.upenn.edu/P/P93/P93-1008.pdf, 8 pgs.

Stephanie Seneff. Article entitled "TINA: A Natural Language System for Spoken Language Applications" Published in the 1992 Edition of Association for Computational Linguistics, vol. 18, No.

(56) References Cited

OTHER PUBLICATIONS 1, pp. 61-86; Obtained at: http://citeseerx.ist.psu.edu/viewdoc/download?doi=10.1.1.75.1626&rep=rep1&type=pdf, 26 pgs.
Ward, et al Abstract entitled "Recent Improvements in the CMU Spoken Language Understanding System." Obtained on May 12, 2011 at website: http://www.aclweb.org/anthology/H/H94/H94-1039.pdf, 4 pgs.
Vickrey, et al Abstract entitled "Sentence Simplification for Semantic Role Labeling." Obtained on May 12, 2011 at website: http://ai.stanford.edu/~dvickrey/underlying.pdf, 9 pgs.
Vanderwende, et al Abstract entitled "Microsoft Research at DUC2006: Task-Focused Summarization with Sentence Simplification and Lexical Expansion." .Obtained on May 12, 2011 at website: http://citeseerx.ist.psu.edu/viewdoc/download?doi=10.1.1.114.2486&rep=rep1&type=pdf, 8 pgs.
Petrov et al, Abstract entitled "Learning and Inference for Hierarchically Split PCFGs" Published in 2007 in cooperation with the Association for the Advancement of Artificial Intelligence. Obtained at: http://www.petrovi.de/data/aaai07.pdf, 4 pgs.
Schapire, et al Abstract entitled "BoosTexter: A Boosting-Based System for Text Categorization," Obtaining May 12, 2011 at website: http://citeseerx.ist.psu.edu/viewdoc/download?doi=10.1.1.33.1666&rep=rep1&type=pdf, 34 pgs.
He, et al Abstract entitled "A Data-Driven Spoken Language Understanding System." Obtained on May 12, 2011 at website: http://citeseerx.ist.psu.edu/viewdoc/download?doi=10.1.1.141.5688&rep=rep1&type=pdf, 6 pgs.
Yaman, et al, Article entitled "An Integrative and Discriminative Technique for Spoken Utterance Classification," Published in the IEEE Transactions on Audio, Speech, and Language Processing Magazine, vol. 16, No. 6, Aug. 2008. pp. 1207-1214. http://research.microsoft.com/pubs/73918/sibel.pdf, 8 pgs.
Gillick, et al Article entitled "Some Statistical Issues in the Comparison of Speech Recognition Algorithms." Published in the Proceedings at the IEEE Conference on Acoustics, Speech and Sig. Proc., Glasglow, 1989; pp. 532-535. http://citeseerx.ist.psu.edu/viewdoc/download?doi=10.1.1.162.2233&rep=rep1&type=pdf, 4 pgs.
Tur, et al, Abstract entitled "What is Left to be Understood in ATIS?" Published in the Proceedings of the IEEE SLT Workshop in Berkeley, CA, 2010. (Not readily available on any website), 6 pgs.
Tur, et al, "Sentence Simplification for Spoken Language Understanding", In Proceedings of International Conference on Acoustics, Speech and Signal Processing, May 22, 2011, 4 pgs.
Hakkani-Tur, et al, "Mining Search Query Logs for Spoken Language Understanding", In Workshop on Future Directions and Needs in the Spoken Dialog Community: Tools and Data, Jun. 7, 2012, pp. 37-40.
Riezler, et al, "Query Rewriting Using Monolingual Statistical Machine Translation", In Journal of Computational Linguistics Archive, vol. 36, Issue 3, Sep. 2010, pp. 569-582.
Agichtein, et al, "Improving Web Search Ranking by Incorporating User Behavior Information", In Proceedings of the 29th Annual International ACM SIGIR Conference on Research and Development in Information Retrieval, Aug. 6, 2006, 8 pgs.
Hakkani-Tur, et al, "Exploiting Query Click Logs for Utterance Domain Detection in Spoken Language Understanding", In Proceedings of International Conference on Acoustics, Speech and Signal Processing, May 22, 2011, 4 pgs.
Hakkani-Tur, et al, "Employing Web Search Query Click Logs for Multi-Domain Spoken Language Understanding", In Proceedings of IEEE Workshop on Automatic Speech Recognition and Understanding, Dec. 11, 2011, 6 pgs.
Jung, J. Jason, "Ontology-based context Synchronization for an ad hoc social collaborations," Knowledge-Based Systems, vol. 21, 2008, pp. 573-580.
Kok, et al, "Hitting the Right Paraphrases in Good Time", In Proceedings of Human Language Technologies: The Annual Conference of the North American Chapter of the Association for Computational Linguistics, Jun. 2010, 9 pgs.
Koehn, et al, "Moses: Open Source Toolkit for Statistical Machine Translation", In Proceedings of the Annual Meeting of the Association for Computational Linguistics, Demonstration and Poster Session, Jun. 2007, 4 pgs.
Och, et al, "A Systematic Comparison of Various Statistical Alignment Models", In Journal of Computational Linguistics, vol. 29, Issue 1, Mar. 2003, 33 pgs.
Tur, et al, "Model Adaptation for Dialog Act Tagging", In Proceedings of IEEE Spoken Language Technology Workshop, Dec. 10, 2006, 4 pgs.
Haffner, et al, "Optimizing SVMS for Complex Call Classification", In Proceedings of IEEE International Conference on Acoustics, Speech, and Signal Processing, Apr. 6, 2003, 4 pgs.
Mittal, et al, "A Hybrid Approach of Personalized Web Information Retrieval" Proceedings of the 2010 IEEE/WIC/ACM International Conference on Web Intelligence and Intelligent Agent Technology, Aug. 31, 2010, vol. 1, pp. 308-313.
G. Tur and R. D. Mori, Eds., Spoken Language Understanding: Systems for Extracting Semantic Information from Speech. New York, NY: John Wiley and Sons, 2011, 484 pgs.
D. Hakkani-Tür, G. Tur, L. Heck, and E. Shriberg, "Bootstrapping Domain Detection Using Query Click Logs for New Domains," in Proceedings of Interspeech, Florence, Italy, 2011.
D. Hillard, A. Celikyilmaz, D. Hakkani-Tür, and G. Tur, "Learning Weighted Entity Lists from Web Click Logs for Spoken Language Understanding," in Proceedings of Interspeech, Florence, Italy, 2011.
A. Celikyilmaz, D. Hakkani-Tür, and G. Tur, "Approximate Interference for Domain Detection in Spoken Language Understanding," in Proceedings of Interspeech, Florence, Italy, 2011.
Richard A. Bolt, "Put-That-There: Voice and Gesture at the Graphics Interface", Architecture Machine Group, MIT, 1980, 9 pgs.
International Search Report & Written Opinion in PCT/US2012/031722 dated Oct. 23, 2012, 11 pgs.
International Search Report & Written Opinion in PCT/US2012/031736 dated Oct. 31, 2012, 12 pgs.
International Search Report & Written Opinion in PCT/US2012/030730 dated Oct. 30, 2012, 10 pgs.
International Search Report & Written Opinion in PCT/US2012/030636 dated Oct. 31, 2012, 12 pgs.
International Search Report & Written Opinion in PCT/US2012/030740 dated Nov. 1, 2012, 12 pgs.
International Search Report & Written Opinion in PCT/US2012/030757 dated Nov. 1, 2012, 10 pgs.
International Search Report & Written Opinion in PCT/US2012/030751 dated Sep. 5, 2012, 9 pgs.
International Search Report & Written Opinion in PCT/US2013/055232 dated Nov. 18, 2013, 10 pgs.
U.S. Official Action dated Aug. 24, 2012, in U.S. Appl. No. 13/077,431, 23 pgs.
U.S. Restriction Requirement dated Nov. 2, 2012, in U.S. Appl. No. 13/077,368, 14 pgs.
U.S. Official Action dated May 29, 2013, in U.S. Appl. No. 13/077,303, 23 pgs.
U.S. Official Action dated Jun. 11, 2013, in U.S. Appl. No. 13/077,455, 22 pgs.
U.S. Official Action dated Jun. 4, 2013, in U.S. Appl. No. 13/077,368, 7 pgs.
U.S. Official Action dated Jul. 25, 2013 in U.S. Appl. No. 13/077,431, 18 pgs.
U.S. Official Action dated Aug. 1, 2013 in U.S. Appl. No. 13/076,862, 32 pgs.
U.S. Official Action dated Dec. 24, 2013 in U.S. Appl. No. 13/592,638, 31 pgs.
U.S. Official Action dated Jan. 7, 2014, in U.S. Appl. No. 13/077,303, 26 pgs.
U.S. Official Action dated Jan. 28, 2014, in U.S. Appl. No. 13/077,455, 27 pgs.
U.S. Official Action dated Feb. 24, 2014, in U.S. Appl. No. 13/077,396, 50 pgs.
U.S. Official Action dated Feb. 28, 2014, in U.S. Appl. No. 13/077,233, 53 pgs.

(56) References Cited

OTHER PUBLICATIONS

U.S. Official Action dated Mar. 20, 2014 in U.S. Appl. No. 13/076,862, 35 pgs.
U.S. Official Action dated Mar. 20, 2014, in U.S. Appl. No. 13/077,368, 22 pgs.
Official Action dated May 15, 2014 in U.S. Appl. No. 13/106,374, 56 pgs.
Official Action dated Jun. 26, 2014, in U.S. Appl. No. 13/077,455, 26 pgs.
Official Action dated Jul. 10, 2014, in U.S. Appl. No. 13/077,303, 31 pgs.
Official Action dated Sep. 5, 2014, in U.S. Appl. No. 13/077,431, 38 pgs.
Official Action dated Sep. 15, 2014, in U.S. Appl. No. 13/077,368, 12 pgs.
Official Action dated Oct. 2, 2014 in U.S. Appl. No. 13/106,374, 42 pgs.
Official Action dated Oct. 10, 2014, in U.S. Appl. No. 13/077,233, 51 pgs.
Official Action dated Oct. 29, 2014, in U.S. Appl. No. 13/077,455, 27 pgs.
Official Action dated Nov. 3, 2014, in U.S. Appl. No. 13/077,303, 28 pgs.
Official Action dated Nov. 19, 2014, in U.S. Appl. No. 13/077,396, 55 pgs.
Notice of Allowance dated Dec. 3, 2014 in U.S. Appl. No. 13/592,638, 23 pgs.
Notice of Allowance dated Feb. 17, 2015 in U.S. Appl. No. 13/592,638, 12 pgs.
Official Action dated Mar. 19, 2015, in U.S. Appl. No. 13/077,431, 24 pgs.
Official Action dated Apr. 9, 2015, in U.S. Appl. No. 13/077,368, 18 pgs.
EP Communication dated Apr. 20, 2015 in Application No. PCT/US2012/030636; 8 pgs.
EP Supplementary Search Report Received for European Patent Application No. PCT/US2012/031736, dated May 11, 2015, 10 pgs.
EP Search Report Issued in European Patent Application No. PCT/US2012/030730, dated May 11, 2015, 9 pgs.
EP Supplementary Search Report issued in European Patent Application No. PCT/US2012/031722, dated May 11, 2015, 11 pgs.
EP Search Report Received for European Patent Application No. 12765896.1, dated May 28, 2015, 12 pgs.
EP Extended Search Report Received for European Patent Application No. 12763913.6, dated Sep. 1, 2015, 13 pgs.
Taiwan Search Report Issued in Patent Application No. 101105673, dated Oct. 16, 2015, 9 Pages.
Lyons, et al., article entitled "Augmenting Conversations Using Dual-Purpose Speech,"—Published Date: 2004; College of Computing and GVU Center, Georgia Institute of Technology, Atlanta, Georgia, http://www.cc.gatech.edu/ccg/publications/dp-uist.pdf,10 pgs.
Website: Fully automated conversation dialog systems, Published Date: Jun. 10, 2008, http://www.gyruslogic.com, 2 pgs.
Díaz et al., "CO-Pretégé: A Groupware Tool for Supporting Collaborative Ontology Design with Divergence"; alicia. diaz@sol.info.unlp.edu.ar; Jul. 18, 2005; [retrieved Mar. 26, 2015]; 4 pgs.
Hu, et al., "SmartContext: An Ontology Based Context Model for Cooperative Mobile Learning", In Computer Supported Cooperative Work in Design III, May 3, 2006, pp. 717-726.
Siebra, et al., "SmartChat—An Intelligent Environment for Collaborative Discussions", In Proceedings of 7th International Conference on Intelligent Tutoring Systems, Aug. 30, 2004, pp. 883-885.
Cozzolongo, et al., "Personalized Control of Smart Environments", In Lecture Notes in Computer Science, vol. 4511, Jul. 25, 2007, 5 pgs.
Nijholt, et al., "Google Home: Experience, Support and Re-Experience of Social Horne Activities", In Information Sciences, vol. 178, Issue 3, Nov. 6, 2007, 19 pgs.
Pissinou, et al., "A Roadmap to the Utilization of Intelligent Information Agents: Are Intelligent Agents the Link Between the Database and Artificial Intelligence Communities?", In IEEE Knowledge and Data Engineering Exchange Workshop, Jan. 1, 1997, 10 pgs.
Klusch; "Information Agent Technology for the Internet: A Survey"; Data & Knowledge Engineering; vol. 36, Mar. 1, 2001, 36 pgs.
Panton et al., "Common Sense Reasoning—From Cyc to Intelligent Assistant"; Cycorp, Inc,; Jan. 1, 2006; Ambient Intelligence in Everyday Life Lecture Notes in Computer Science; 32 pgs.
Kolski et al., "A Review of Intelligent Human-Machine Interfaces in the Light of the ARCH Model"; Published online Nov. 13, 2009; International Journal of Human-Computer Interaction; vol. 10, No. 3; Sep. 1, 1998.
U.S. Official Action dated May 5, 2015, in U.S. Appl. No. 13/077,455, 14 pgs.
U.S. Official Action dated May 28, 2015 in U.S. Appl. No. 13/106,374, 44 pgs.
U.S. Official Action dated Jun. 4, 2015, in U.S. Appl. No. 13/077,396, 35 pgs.
U.S. Official Action dated Jun. 12, 2015, in U.S. Appl. No. 13/077,303, 25 pgs.
U.S. Official Action dated Jul. 1, 2015 in U.S. Appl. No. 13/076,862, 60 pgs.
Notice of Allowance dated Sep. 18, 2015, in U.S. Appl. No. 13/077,455, 22 pgs.
Notice of Allowance dated Oct. 7, 2015, in U.S. Appl. No. 13/077,366, 24 pgs.
U.S. Official Action dated Nov. 27, 2015, in U.S. Appl. No. 13/077,431, 15 pgs.
U.S. Official Action dated Dec. 4, 2015, in U.S. Appl. No. 13/077,396, 45 pgs.
U.S. Official Action dated Dec. 4, 2015 in U.S. Appl. No. 13/106,374, 64 pgs.
U.S. Official Action dated Dec. 7, 2015, in U.S. Appl. No. 13/077,303, 32 pgs.
U.S. Patent Application entitled "Location-Based Conversational Understanding" having U.S. Appl. No. 14/989,974, filed Jan. 7, 2016.
Chinese Office Action and Search Report Issued in Patent Application No. 201210092263.0, dated Dec. 10, 2015, 15 pgs.
Chinese Office Action and Search Report Issued in Patent Application No. 201210101485.4, dated Dec. 11, 2015, 14 Pages.
U.S. Official Action dated Jan. 14, 2016 in U.S. Appl. No. 13/076,862, 44 pgs.
U.S. Appl. No. 13/077,233, Examiner's Answer to the Appeal Brief dated Aug. 4, 2017, 13 pages.
U.S. Appl. No. 13/077,303, Notice of Allowance dated Aug. 24, 2017, 7 pgs.
U.S. Appl. No. 14/989,974, Office Action dated Aug. 14, 2017, 20 pgs.
Chinese Decision on Rejection in Application 201210091176.3, dated Aug. 2, 2017, 11 pages.
Chinese Notice of Allowance in Application 201210101485.4, dated Jun. 29, 2017, 4 pages.
PCT 2nd Written Opinion in International Application PCT/US2016/050840, dated Jul. 24, 2017, 7 pages.
U.S. Appl. No. 13/077,233, Appeal Brief filed Jun. 12, 2017, 32 pages.
U.S. Appl. No. 13/077,431, Office Action dated Jul. 14, 2017, 15 pages.
U.S. Appl. No. 13/077,396, Notice of Allowance dated Jul. 28, 2017, 25 pages.
Chinese Office Action in Application 201210091176.3, dated Feb. 2, 2018, 5 pages.
U.S. Appl. No. 13/077,431, Office Action dated Jan. 29, 2018, 15 pages.
Japanese Notice of Allowance in Application 2017-038097, dated Feb. 5, 2018, 3 pages. (No English Translation.).
Yasufumi Kaneko et al., Detecting Search Intention by Analyzing Relationship between Keywords with Relaxation Value and an Interface for Inputting Keywords, Jun. 27, 2008, Journal of DBSJ, the 7th volume, No. 1, p. 181-186 (No English Translation).

(56) References Cited

OTHER PUBLICATIONS

Korean Office Action in Application 10-2013-7025540, dated Jan. 31, 2018, 13 pages.
U.S. Appl. No. 14/989,974, Notice of Allowance dated Feb. 5, 2018, 5 pgs.
U.S. Appl. No. 15/271,859, Office Action dated Jan. 8, 2018, 44 pages.
Cao et al., "Integrating Word Relationships into Language Models," In Proceedings of 28th Annual International ACM SIGIR Conference on Research and Development in Information Retrieval, Aug. 15, 2005, 8 pages.
Chinese 2nd Office Action in Application 201210092263.0, dated Aug. 16, 2016, 5 pgs.
Chinese 2nd Office Action in Application 201210101485.4, dated Aug. 16, 2016, 5 pgs.
Chinese Office Action in Application 201210087420.9, dated Jan. 12, 2017, 5 pages.
Chinese Office Action in Application 201210091176.3, dated Dec. 21, 2016, 9 pages.
Japanese Notice of Allowance in Application 2014-502723, dated Jan. 4, 2017, 3 pages. (No English Translation.).
Japanese Office Action in Application 2014502721, dated Nov. 22, 2016, 4 pages.
PCT International Search Report in PCT/US2013/049085, dated Nov. 7, 2013, 8 pages.
PCT International Search Report in PCT/US2016/050840, dated Dec. 6, 2016, 12 pages.
U.S. Appl. No. 13/076,862, Notice of Allowance dated Dec. 1, 2016, 16 pages.
U.S. Appl. No. 13/077,233, Office Action dated Nov. 10, 2016, 41 pages.
U.S. Appl. No. 13/077,303, Advisory Action dated Feb. 2, 2017, 3 pages.
U.S. Appl. No. 13/077,303, Office Action dated Oct. 26, 2016, 16 pages.
U.S. Appl. No. 13/077,396, Office Action dated Jan. 27, 2017, 36 pages.
Huston et al., "Evaluating verbose query processing techniques", Proceedings of the 33rd International ACM Sigir Conference on Research and evelopment in Information Retrieval, Sigir '10, ACM Press, New York, New York, Jul. 19, 2010, pp. 291-298.
U.S. Appl. No. 13/106,374, Notice of Allowance dated Aug. 4, 2016, 2 pgs.
Molla et al., "AnswerFinder at TREC 2004," In Proceedings of the Thirteenth Text Retrieval Conference, TREC, Nov. 16, 2004, 9 pages.
U.S. Appl. No. 13/539,674, Office Action dated Mar. 17, 2015, 12 pages.
U.S. Appl. No. 13/539,674, Office Action dated Oct. 27, 2015, 15 pages.
U.S. Appl. No. 13/077,431, Office Action dated Feb. 3, 2017, 16 pages.
Wang et al., "Web-Based Unsupervised Learning for Query Formation in Question Answering", Proc 2nd Intl Joint Conf on Natural Language Processing, Oct. 2005, 12 pages.
Chu-Carroll et al., "A Hybrid Approach to Natural Language Web Search," Proc of Conf on Empirical Methods in Natural Language Processing, Jul. 2002, Association for Computational Linguistics, 8 pages.
Di Buccio Emanuele et al., "Detecting verbose queries and improving information retrieval," Information Processing & Management, vol. 50, No. 2, Oct. 28, 2013, 19 pages.
Goodwin, "Which Search Engine Would be a Jeopardy Champion?" retrieved Apr. 12, 2012 from http://searchenginewatch.com/article/2050114/which-search-engine-would-be-a-jeopardy-champion, Jan. 2011, 2 pages.
Gupta et al., "Information Retrieval with Verbose Queries", Foundations and Trends in Information Retrieval, vol. 9, No. 3-4, Jul. 31, 2015, pp. 209-354.
Japanese Notice of Allowance in Application 2014-502718, dated Feb. 1, 2017, 3 pages. (No English Translation.).
Chinese Office Action in Application 201210101485.4, dated Feb. 20, 2017, 5 pages.
Chinese Notice of Allowance in Application 201210093414.4, dated Feb. 9, 2017, 8 pages.
Chinese Notice of Allowance in Application 201210092263.0, dated Feb. 28, 2017, 4 pgs.
Chinese 2nd Office Action in Application 201210090349.X, dated Feb. 28, 2017, 9 pgs.
Chinese 2nd Office Action in Application 201210090634.1, dated Mar. 21, 2017, 9 pgs.
U.S. Appl. No. 13/076,862, Notice of Allowance dated May 3, 2017, 14 pgs.
U.S. Appl. No. 13/077,303, Ex-Parte Quayle Action dated May 4, 2017, 6 pgs.
U.S. Appl. No. 14/989,974, Office Action dated Mar. 29, 2017, 16 pgs.
Chinese Notice of Allowance in Application 201210087420.9, dated May 4, 2017, 4 pgs.
Chinese Notice of Allowance in Application 201210090349.X, dated Aug. 31, 2017, 4pgs.
U.S. Appl. No. 13/077,396, Notice of Allowance dated Aug. 30, 2017, 20 pgs.
U.S. Appl. No. 13/077,303, Notice of Allowance dated Sep. 18, 2017, 2 pgs.
U.S. Appl. No. 13/077,396, USPTO Response to 312 Amendment dated Nov. 9, 2017, 2 pgs.
U.S. Appl. No. 14/856,139, Office Action dated Nov. 9, 2017, 18 pgs.
U.S. Appl. No. 15/818,432, Office Action dated Dec. 29, 2017, 15 pages.
Chinese 3rd Office Action in Application 201210090634.1, dated Oct. 31, 2017, 11 pages.
U.S. Appl. No. 14/989,974, Notice of Allowance dated Dec. 19, 2017, 8 pgs.
PCT International Preliminary Report on Patentability in International Application PCT/US2016/050840, dated Dec. 12, 2017, 9 pgs.
U.S. Appl. No. 14/989,974, Notice of Allowance dated Apr. 13, 2018, 5 pgs.

\* cited by examiner

TRANSLATING NATURAL LANGUAGE UTTERANCES TO KEYWORD SEARCH QUERIES

CROSS-REFERENCE/RELATED APPLICATIONS

This application is a continuation of, and claims priority to U.S. patent application Ser. No. 13/592,638, filed Aug. 23, 2012, entitled "TRANSLATING NATURAL LANGUAGE UTTERANCES TO KEYWORD SEARCH QUERIES," now issued U.S. Pat. No. 9,064,006. This Application is related to U.S. patent application Ser. No. 13/106,374, filed on May 12, 2011, entitled "SENTENCE SIMPLIFICATION FOR SPOKEN LANGUAGE UNDERSTANDING," now issued U.S. Pat. No. 9,454,962, each of which is hereby incorporated by reference in their entirety.

BACKGROUND

Conversational, or natural language, questions and speech differ both stylistically and in content from commands and queries given to computers. For example, one person may ask a friend "Is there a good Italian place nearby?" while a search query to a computer may be phrased "Italian restaurant nearby." Conventional approaches to handling keyword search queries depend on reviewing search engine logs to determine which queries correlate to which selected links and using this data to provide those same links when the same queries occur. This approach fails to improve search results for natural language queries, however, because of the tremendous variation in conversational style between users, even when attempting to create the same search parameters.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Natural language query translation may be provided. A statistical model may be trained to detect domains according to a plurality of query click log data. Upon receiving a natural language query, the statistical model may be used to translate the natural language query into an action, such as a search engine query. The action may then be performed and at least one result associated with performing the action may be provided.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
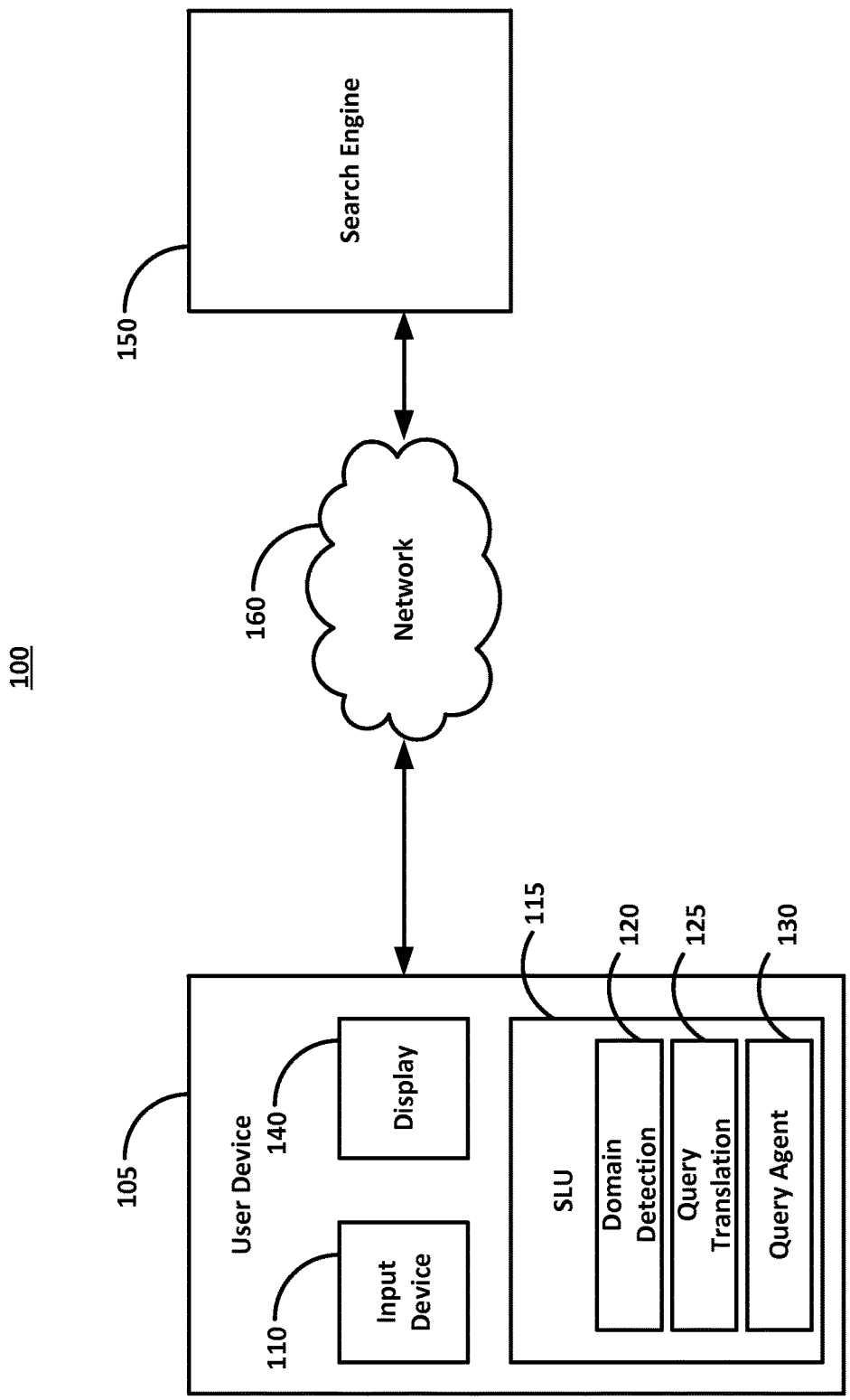
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Spoken language understanding (SLU) in human/machine spoken dialog systems is a process that aims to automatically identify a user's goal-driven intents for a given domain. For example, the user's intent may be to make a dinner reservation, with goals of: (a) locating a restaurant (b) in a particular area (c) with available reservations and (d) for a particular time and date. A query may be expressed in natural language, such as "find me an Italian restaurant nearby with a table for two," and the SLU system may detect a top level domain as an initial classification. In the example query above, the domain may comprise "restaurants."

SLU systems enable users to speak naturally to computers, but the success and broad use of keyword search engines imply the strength of keyword searches. Some users may attempt to speak in keywords, hoping for better machine understanding. SLU systems consistent with embodiments of this disclosure may be capable of handling either style of query that may be received from a user.

Domain detection for a query may be accomplished by parsing the user's query through a statistical model that uses extracted features, such as keywords relating to a user's desired action or intent, to determine a statistically most-likely domain for the query. Such domain detection models may be trained via supervised machine learning methods that use lexical, contextual, and other semantic features. Consistent with embodiments of this disclosure, naturally spoken user queries may be translated into a form similar to keyword search queries. Features extracted from the query may be statistically compared to those extracted from search engine query click logs that capture the behavior of an abundance of users who typed in the same and/or a similar search query.

Search query click log data ("click data") comprises an aggregation of past search engine users' queries and the links these users click from a list of sites returned by the search engine. This click data may be used as implicit supervision to improve future search decisions. The click data may be mined, for example, to train domain detection statistical models when little or no in-domain data was available. Furthermore, the click data may help enrich existing training data sets with new features, such as computing the click distribution over a set of related Uniform Resource Locators (URLs) from search query click logs.

Since the form of natural language queries often differs from shorter keyword search queries, the natural language queries may be transformed into query-like sentences using a syntax-based transformation and domain independent salient phrases (DISPs) learned from multi-domain user utterances. These DISPs may comprise introductory phrases such as "how far is . . . ," "show me . . . ," "what are the . . . ," "find a . . . ," etc. By analyzing queries across multiple domains, it is possible to identify such common salient phrases that identify an incoming query as a natural language query. Once identified, these queries may be processed and/or pre-processed differently than incoming keyword searches. For example the domain-specific portions of the natural language query may be mapped to a similar keyword query.

While these transformations help improve domain detection, the transformed queries may not necessarily be targeted to match the style of keyword search queries. In some embodiments consistent with this disclosure, statistical machine translation (SMT) may operate to translate user utterances to a search query form.

Training for the SMT models may use semantically similar natural language utterances and query pairs that may be mined by walking on a bi-partite query click graph. Search query click logs can be represented as a bi-partite graph with two types of nodes corresponding to queries and URLs. Edges are added to the click graph mapping which URL(s) a user clicks on after providing a particular query. The graph is then searched for queries that include domain independent salient phrases (DISP). These queries represent natural language queries and form a seed set for mining pairs.

Some example natural language/keyword pairs, and their corresponding DISP(s), that may be found in click data shown in Table 1, below. As seen, there are cases where the words or phrases in the input query are translated into other words (e.g., "biggest US companies" is translated into "fortune 500 companies"). Once the NL queries are translated into keyword queries, features for domain detection may be extracted.

TABLE 1

| Natural Language Query | Keyword Query | DISP(s) |
|---|---|---|
| What are the signs of throat cancer? | Throat cancer symptoms | What are the |
| How many calories do I need to eat in a day? | Calories per day | How many I need |
| What are the biggest US companies? | Fortune 500 companies | What are the |
| How do I know if I am anemic? | Anemia | How do I |
| Find me the closest Italian restaurant | Italian restaurant downtown | Find me |

The query click graph identifies a set of keyword queries that are most semantically similar to the natural language (NL) queries. To minimize the computational cost of walking the graph, the URL that has the maximum click probability given the natural language query in question is used and a similarity between the natural language query and a keyword query corresponding to that URL is calculated. The pairs that have the highest similarity form the basis for training SMT models. In short, when the same URL has a high click-through rate for a given NL query and a keyword query, and the semantic similarity between the NL query and keyword query (with or without the DISP included), the pair may be considered a high value pair for training the SMT model. A similar strategy may be used to map any two different types of queries, such as mapping queries in different languages to each other based on common URL click data.

Domain detection may be framed as a classification problem. Given a user's query, the problem is to associate a subset of domains with the query from amongst all possible domains. To solve this classification problem, a class of domains with a maximum conditional probability is selected.

Supervised classification methods may be used to estimate these conditional probabilities, and a set of labeled queries may be used in training a statistical model. These labeled queries may comprise, for example, explicitly human-annotated query click log data and/or implicitly annotated data. Classification may employ lexical features such as word n-grams, contextual features such as a previous query's domain, semantic features such as named entities in the utterance (e.g., specific locations or people), syntactic features such as part-of-speech tags, topical features such as latent semantic variables and so on.

The implicitly annotated data coming from click data may be leveraged as additional features for training domain detection classification models. This is straight-forward in cases where a given user utterance is found in the click data with relatively high frequency, but the language used in natural language queries in an SLU system is different from keyword-based queries. For some domains, such as one where the users are scheduling their own meetings, queries are unlikely to occur in the click data. In this case, the absence of a mapped query in the click data also provides information about the category of an utterance.

Users typically generate different sequences of words according to their intent and depending on whether they interact with a web search engine, another human, or an intelligent SLU system. When they wonder about the "capacity of a Boeing 737," they can form a simple keyword-based query such as "capacity Boeing 737" when interacting with a search engine. When they are interacting with an intelligent SLU system, they may provide a more natural language query, such as "what is the capacity of a Boeing 737 airplane." A syntactic parsing based sentence transformation method may strip domain-independent words and convert this query to "capacity 737," so that the domain classifier can perform better on them.

Such transformed natural language queries are often semantically similar to keyword-based search engine queries. Hence, it is possible to use the URL click distributions for the similar keyword-based query. For example, the natural language query "I need to make a reservation for dinner" may be transformed as "make reservation," and that query may result in clicks to webpages that offer the user the ability to create restaurant reservations. The domain detection can exploit this orthogonal information in addition to the input query. For example, the translated query may be searched in the query click data and the URL click distribution feature may be used to help determine the domain of the input query.

FIG. 1 is a block diagram of an operating environment 100 that may provide natural language query translation. Operating environment 100 may comprise a user device 105 comprising an input device 110, such as a camera and/or microphone. Input device 110 may be coupled to a spoken language understanding module 115 comprising a domain detection module 120, a query translation module 125, and a query agent 130. User device 105 may further comprise a display 140. User device 110 may be operative to communicate with other computing devices, such as transmitting queries from query agent 130 to a search engine 150 via a network 160 and receiving results from search engine 150 for output to display 140.

Figure 2:
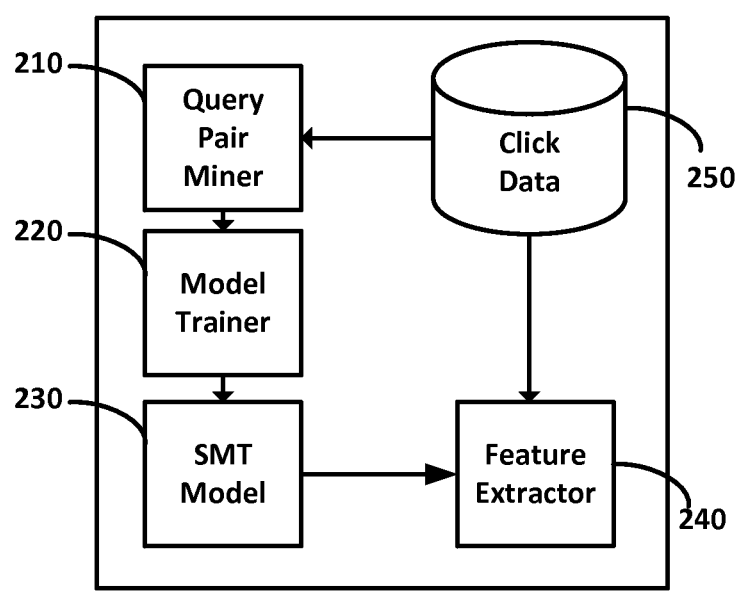
FIG. 2 is an illustration of a query click log graph.

FIG. 2 is a block diagram of a trainer 200 for domain detection module 120. Trainer 200 comprises a query pair miner 210, a model trainer 220, a statistical machine translator (SMT) model 230, a feature extractor 240, and a query click log database 250. Domain detection module 120 may use a set of phrases that are typical of natural language queries referred to as domain independent salient phrases (DISP). Query pair miner 210 may mine semantically similar natural language query and keyword-based search query pairs. Model trainer 220 may use these mined pairs to train SMT model 230 to convert natural language queries to keyword-based queries. Feature extractor 240 may analyze the query pairs and associated uniform resource locators (URLs) from query click logs database 250 for features useful in domain detection.

Newly received queries, such as may be provided by a user via input device 110, may be fed into SMT model 230 to be translated into a keyword-based query, and the natural language/keyword query pair may be checked against the click data from query click log database 250. A set of features may be computed from any click data corresponding to the query pair. If the query pair is not seen in the query click logs, this information is also provided to domain detection module 120, as it may indicate that the input belongs to a domain where there are no queries categorically related to information on the web.

DISPs comprise words and/or phrases that are salient for more than one domain. Available labeled training data from other domains may be used to identify these DISPs. For each n-gram in a data set, a probability distribution over all possible domains and the Kullback-Leibler (KL) divergence between this distribution and the prior probabilities over all domains may be computed. The word n-grams that show the least divergence from the prior distribution may be selected as the domain-independent salient phrases. Such phrases may comprise, for example, "show me all the" or "I want information on" that frequently appear in natural language utterances directed to spoken dialog systems for information access.

Model trainer 220 may use training data consisting of millions of high precision pairs mined as described above. When a natural language query has more than one corresponding query based on a selected threshold, a most frequent keyword-based query may be used. Training data may comprise search engine result data across all searches, and/or may be targeted to specific domains of interest to a particular SLU system. Minimum error rate training (MERT) processes may be used to tune the probability weighting of the training data.

Figure 3:
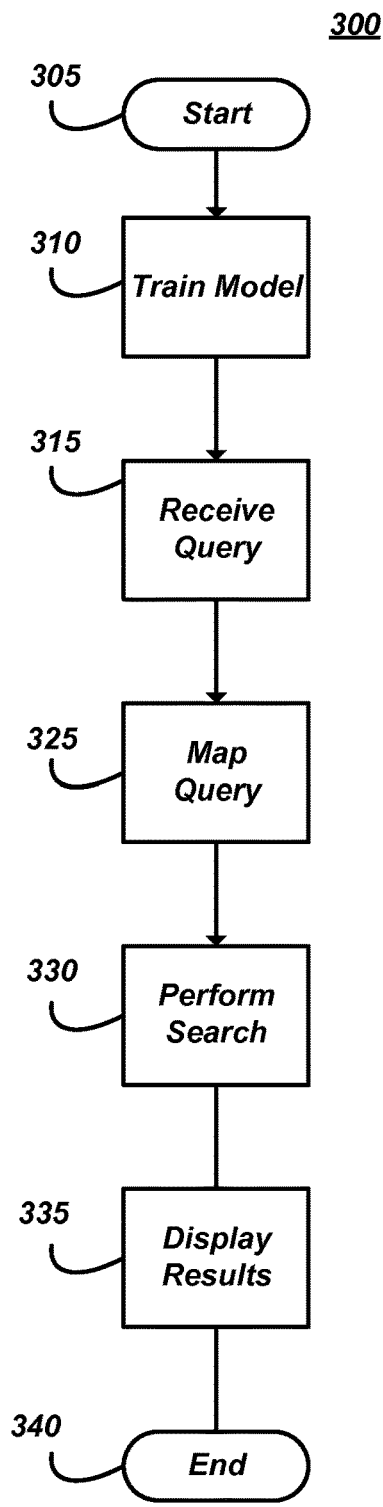
FIG. 3 is a flow chart of a method for providing natural language query translation.

FIG. 3 is a flow chart setting forth the general stages involved in a method 300 consistent with an embodiment of the disclosure for providing natural language query translation. Method 300 may be implemented using a computing device 400 as described in more detail below with respect to FIG. 4. Ways to implement the stages of method 300 will be described in greater detail below. Method 300 begins at starting block 305 and proceeds to stage 310 where computing device 400 may train a statistical machine translation model according to a plurality of mined query pairs. For example, a plurality of domain independent salient phrases (DISPs) may be identified and used to identify a plurality of previous natural language queries according to the plurality of DISPs in a set of query click log data. Each of the identified natural language queries may be associated with a keyword-based query into a mined query pair of the plurality of mined query pairs according to a uniform resource locator (URL) click graph. Such a click graph may comprise a weighted distribution of URLs selected in response to previous natural language queries and previous keyword-based queries. Common features for each of the mined query pairs may also be extracted to aid in domain detection.

Method 300 may then advance to stage 315 where computing device 400 may receive a new query from a user. For example, user device 105 may receive a query such as "what are some good Italian restaurants nearby."

Method 300 may then advance to stage 325 where computing device 400 may map the query into a keyword-based query according to the trained statistical machine translation (SMT) model. For example, SLU module 115 may detect whether the query comprises a natural language query by determining whether the received query comprises any DISPs. Even when the received query is not a natural language query, the SMT model may translate the received query into a different format and/or word order to better correlate with common, previously received queries. For the query "what are some good Italian restaurants nearby," for example, SMT model 230 may identify a query pair associated with locating restaurants that comprises similar extracted features to the newly received query, such as an associated geographic location.

After mapping the natural language query into a keyword-based query at stage 325, or if the new query was determined not to be in natural language form at stage 320, method 300 may advance to stage 330 where computing device 400 may perform the search action. For example, the query may be provided to search engine 150 for execution.

Method 300 may then advance to stage 335 where computing device 400 may provide a plurality of results associated with the search to the user. For example, search engine 150 may return a plurality of URLs according to the search query that may be output to display 140. The URL distribution associated with the mapped keyword-based query may be used to order and/or re-order the results. Method 300 may then end at stage 340.

An embodiment consistent with the invention may comprise a system for providing natural language query translation. The system may comprise a memory storage and a processing unit coupled to the memory storage. The processing unit may be operative to train a statistical model to detect domains according to a plurality of query click log data. Upon receiving a natural language query, the processing unit may be operative to use the statistical model to translate the natural language query into an action. The processing unit may then be perform the action and provide at least one result associated with performing the action.

Another embodiment consistent with the invention may comprise a system for providing natural language query translation. The system may comprise a memory storage and a processing unit coupled to the memory storage. The processing unit may be operative to receive a query from a user, determine whether the query comprises a natural language query, and in response to determining that the query comprises the natural language query, map the natural language query into a keyword-based query, perform a search according to a query pair comprising the natural language query and the keyword-based query, and provide a plurality of results associated with the search to the user.

Yet another embodiment consistent with the invention may comprise a system for providing natural language query translation. The system may comprise a memory storage and a processing unit coupled to the memory storage. The processing unit may be operative to train a statistical machine translation model according to a plurality of mined query pairs, extract a plurality of common features for each of the mined query pairs, receive a new query from a user, and determine whether the new query comprises a new natural language query. In response to determining that the query comprises the natural language query, the processing unit may be operative to map the new natural language query into a keyword-based query according to the trained statistical machine translation model. The processing unit may be further operative to perform a search according to the new query and provide a plurality of results associated with the search to the user.

Figure 4:
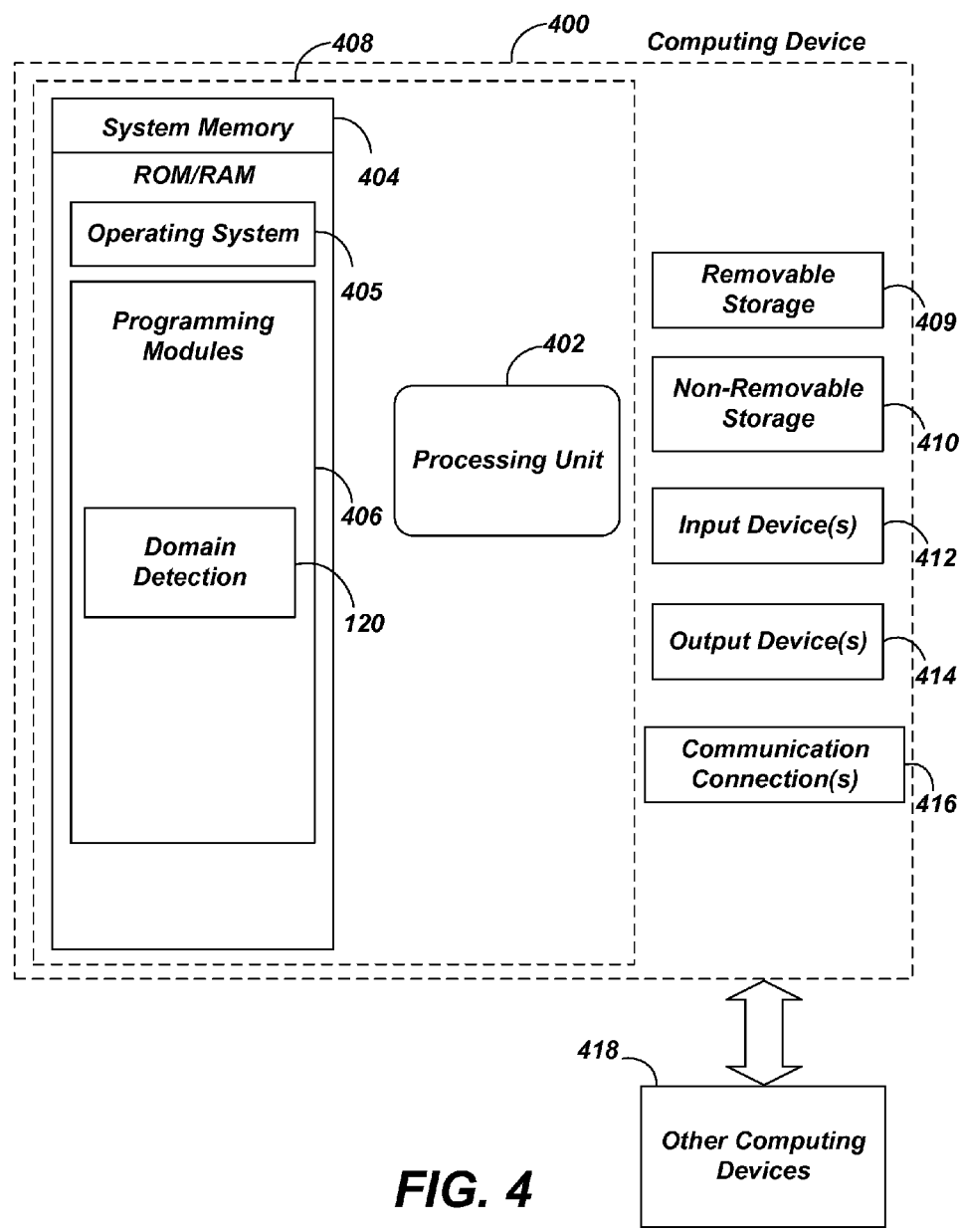
FIG. 4 is a block diagram of a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise user device 100 as described above. Methods described in this specification may operate in other environments and are not limited to computing device 400.

With reference to FIG. 4, a system consistent with an embodiment of the disclosure may include a computing device, such as computing device 400. In a basic configuration, computing device 400 may include at least one processing unit 402 and a system memory 404. Depending on the configuration and type of computing device, system memory 404 may comprise, but is not limited to, volatile (e.g., random access memory (RAM)), non-volatile (e.g., read-only memory (ROM)), flash memory, or any combination. System memory 404 may include operating system 405, one or more programming modules 406, and may comprise, for example, domain detection module 120. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 (e.g., translation API 120) may perform processes and/or methods as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Figure 5A:
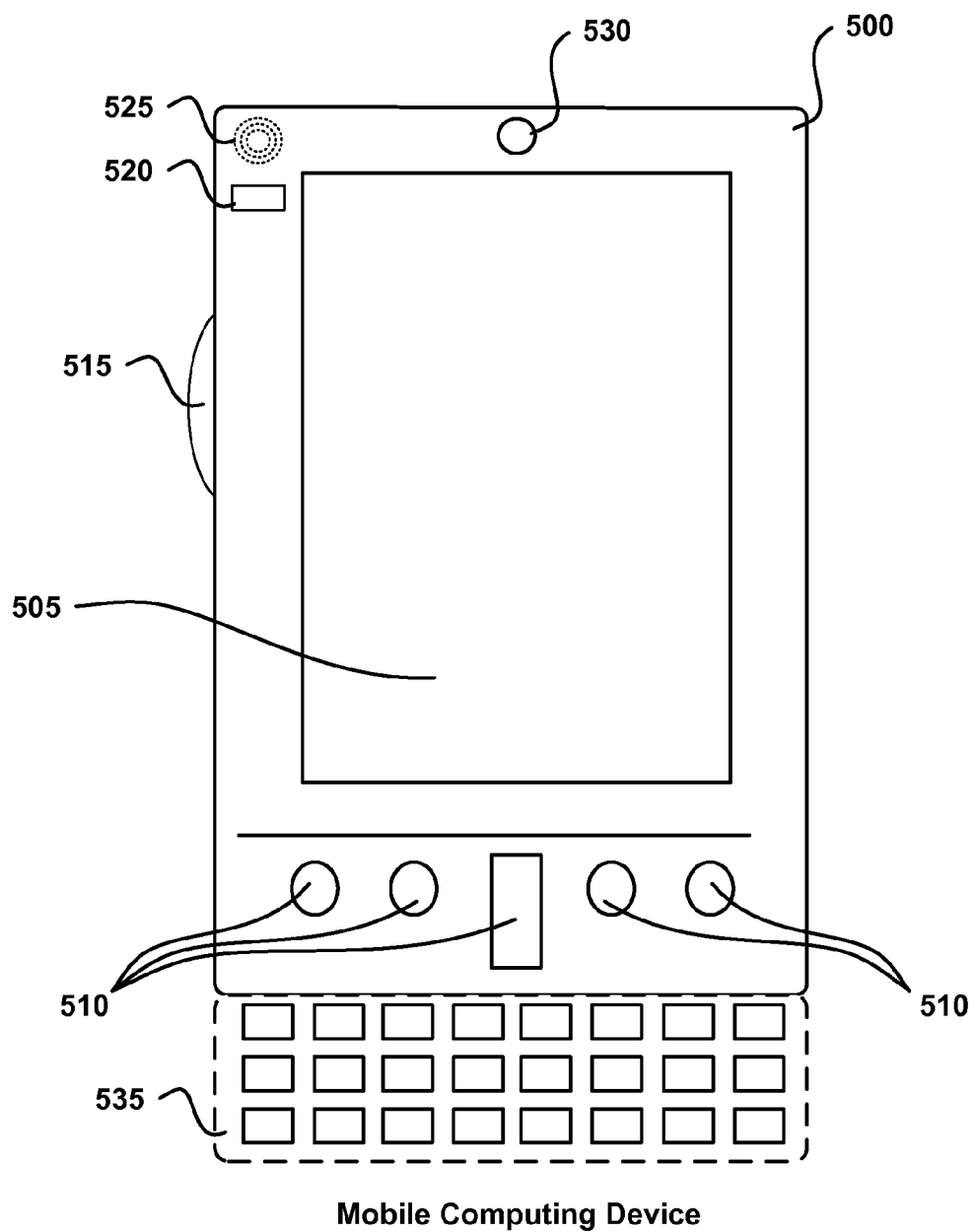
FIGS. 5A-5B are simplified block diagrams of a mobile computing device with which embodiments of the present disclosure may be practiced.
Figure 5B:
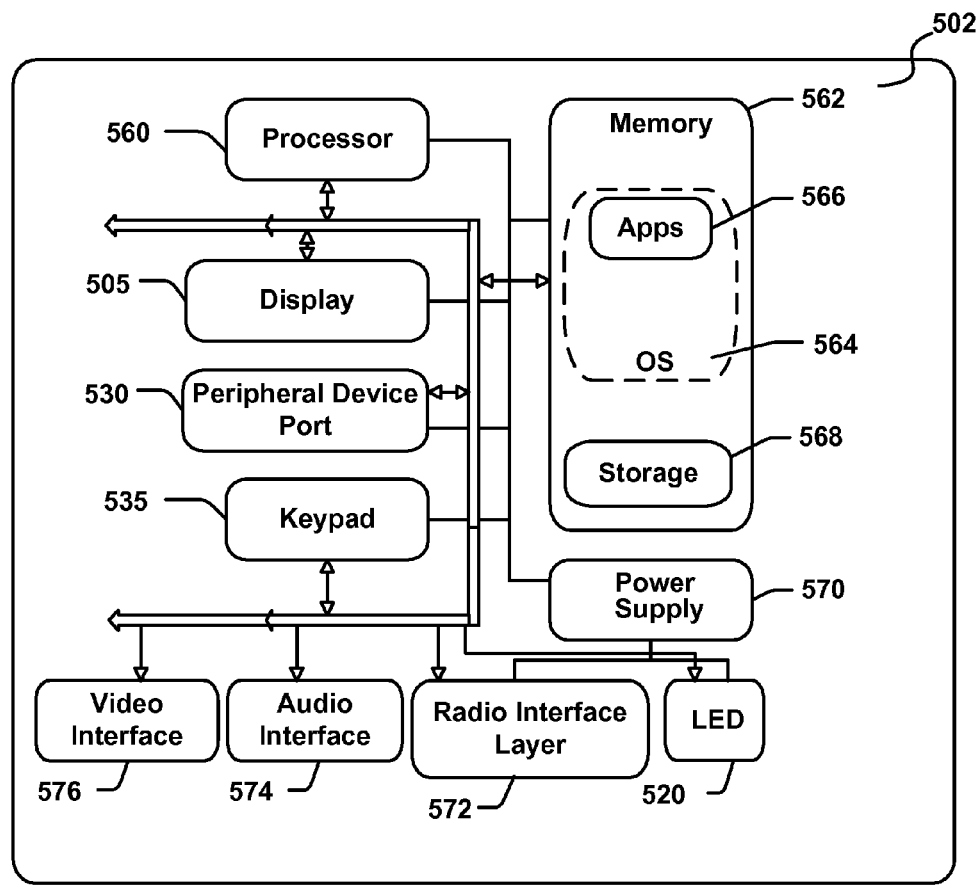

FIGS. 5A and 5B illustrate a mobile computing device 500, for example, a mobile telephone, a smart phone, a tablet personal computer, a laptop computer, and the like, with which embodiments of the disclosure may be practiced. With reference to FIG. 5A, an exemplary mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries. The system 502 may also include a radio 572 that performs the function of transmitting and receiving radio frequency communications. The radio 572 facilitates wireless connectivity between the system 502 and the "outside world", via a communications carrier or service provider. Transmissions to and from the radio 572 are conducted under control of the operating system 564. In other words, communications received by the radio 572 may be disseminated to the application programs 566 via the operating system 564, and vice versa.

The radio 572 allows the system 502 to communicate with other computing devices, such as over a network. The radio 572 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 502 provides notifications using the visual indicator 520 that can be used to provide visual notifications and/or an audio interface 574 producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568. Computer storage media may include volatile and nonvolatile, removable and non-removable media implemented in any method or technology for storage of information, such as computer readable instructions, data structures, program modules, or other data.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

Figure 6:
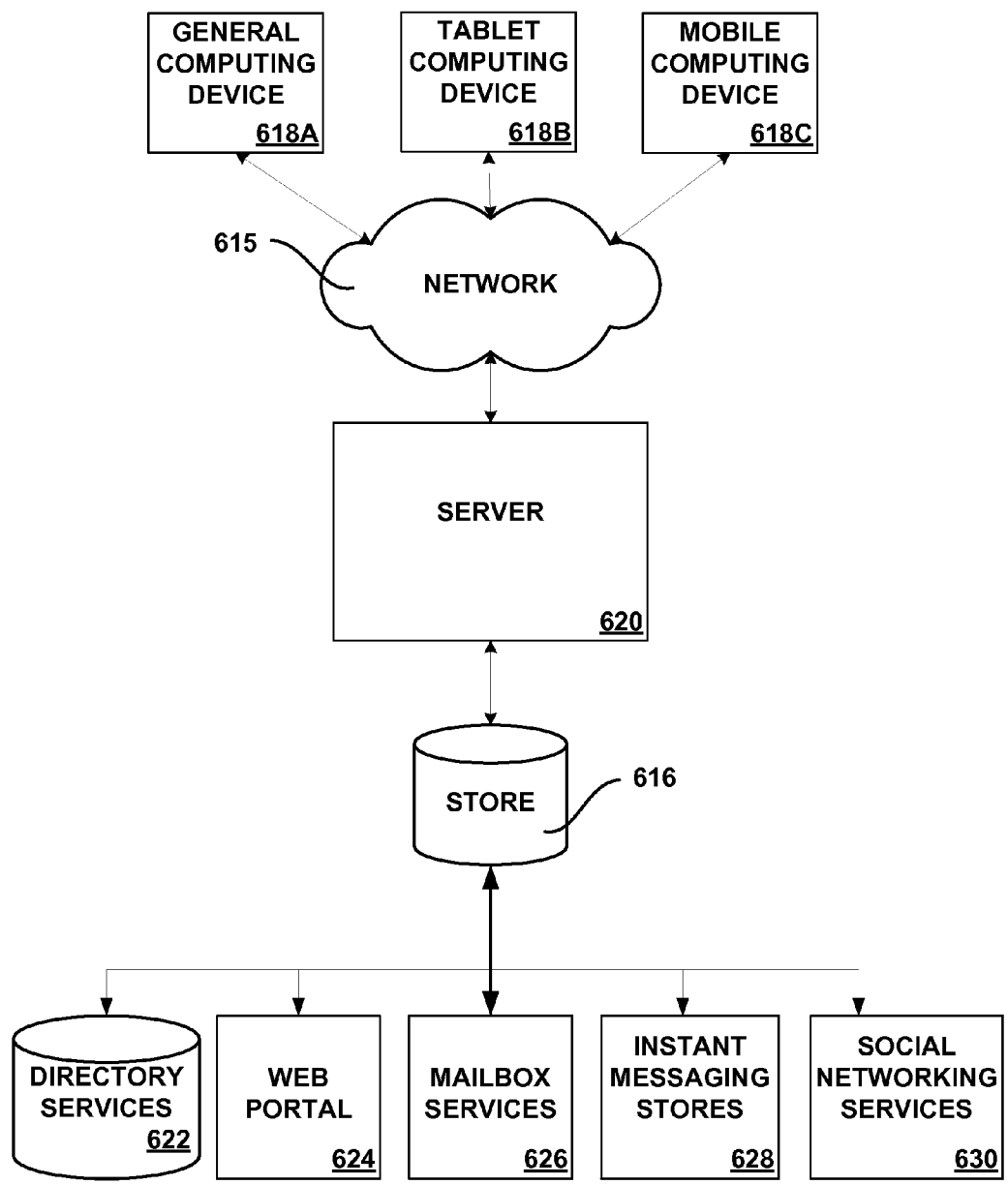
FIG. 6 is a simplified block diagram of a distributed computing system in which embodiments of the present disclosure may be practiced.

FIG. 6 illustrates one embodiment of the architecture of a system for providing applications to one or more client devices, as described above. Content developed, interacted with or edited in association with such applications may be stored in different communication channels or other storage types. For example, various documents may be stored using a directory service 622, a web portal 624, a mailbox service 626, an instant messaging store 628, or a social networking site 630. An email client application, for example, may use any of these types of systems or the like for enabling co-authoring conflict resolution via comments, as described herein. A server 620 may provide applications to the clients. As one example, the server 620 may be a web server providing an email client application over the web. The server 620 may provide the email client application over the web to clients through a network 615. By way of example, the client computing device 618 may be implemented as computing device 400 and embodied in a personal computer 618a, a tablet computing device 618b and/or a mobile computing device 618c (e.g., a smart phone). Any of these embodiments of the client computing device 618 may obtain content from the store 616. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, may operate via application-specific logic integrated with other components of the computing device/system X on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method for providing natural language query translation, the method comprising:
    training a statistical machine translation model according to a plurality of mined query pairs, wherein training the statistical machine translation model comprises:
        identifying a set of previously received keyword type queries that are semantically similar to a set of previously received natural language type queries utilizing a query click graph,
        pairing at least one keyword type query with a natural language type query that is most semantically similar to form the mined query pairs;
    receiving a new natural language type query;
    mapping the new natural language type query into a new keyword-based type query according to the trained statistical machine translation model;
    performing a search query according to the new keyword-based type query; and
    providing at least one result from the search query.

2. The method of claim 1, wherein the new natural language type query is received as text.

3. The method of claim 1, wherein the new natural language type query is received as speech.

4. The method of claim 1, wherein training the statistical machine translation model comprises identifying a plurality of domain independent salient phrases.

5. The method of claim 4, wherein at least one of the plurality of domain independent salient phrases comprises at least one word indicating that an associated search query comprises a natural language type search query.

6. The method of claim 4, wherein training the plurality of mined query pairs is associated with a plurality of search engine results.

7. The method of claim 6, further comprising identifying a plurality of search queries associated with the plurality of mined query pairs that comprise natural language type search queries according to the plurality of domain independent salient phrases.

8. The method of claim 1, wherein a correlation between a previously received natural language type query and a previously received keyword-based type query is associated with a Uniform Resource Locator (URL) distribution.

9. The method of claim 8, wherein performing the search query comprises:
    searching the plurality of mined query pairs for a query pair corresponding to the search query; and
    identifying a domain associated with the search query according to the URL distribution.

10. The method of claim 1, wherein the plurality of query pairs comprises a query pair associated with a geographic location.

11. The method of claim 1, wherein the at least one result is associated with at least one webpage.

12. A system for providing natural language query translation, the system comprising:
    a memory storage; and
    a processing unit coupled to the memory storage, wherein the processing unit is operable to:
        train a statistical machine translation model according to a plurality of mined query pairs,
        wherein train the statistical machine translation model comprises;
            identifying a set of previously received keyword type queries that are semantically similar to a set of previously received natural language type queries utilizing a query click graph,
            pairing at least one keyword type query with at least one natural language type query that is most semantically similar to form the mined query pair;
        receive a query from a user,
        determine whether the query is a natural language type query or is a keyword type query, and
        in response to determining that the query comprises the natural language type query:
            map the natural language type query into a keyword-based type query according to the trained statistical machine translation model;
            perform a search query according to the natural language type query and the keyword-based type query; and
            provide a plurality of results associated with the search query to the user.

13. The system of claim 12, wherein being operative to map the natural language type query into the keyword-based type query comprises being operative to:
    detect a domain associated with the natural language type query; and
    strip at least one domain-independent word from the natural language type query.

14. The system of claim 13, wherein being operative to detect the domain associated with the natural language type query comprises being operative to:
    identify a subset of a plurality of possible domains according to at least one feature of the natural language type query.

15. The system of claim 14, wherein the at least one feature of the natural language type query comprises at least one of the following: a lexical feature, a contextual feature, a semantic feature, a syntactic feature, and a topical feature.

16. The system of claim 14, wherein being operative to map the natural language type query into the keyword-based type query comprises being further operative to:
    convert the natural language type query into the keyword-based type query according to the trained statistical machine translation model.

17. The system of claim 12, wherein a previously received natural language type query is identified according to a domain independent salient phrase.

18. The system of claim 12, wherein a previously received natural language type query and a previously received keyword-based type query are associated according to a weighted Uniform Resource Locator (URL) click graph.

19. The system of claim 12, wherein the mined query pairs comprises a statistical weighting according to a semantic correlation between a previously received natural language type query and a previously received keyword-based type query.

20. A mined query pair computer-readable medium which stores a set of instructions which when executed performs a method for providing natural language query translation, the method executed by the set of instructions comprising:
- training a statistical machine translation model according to a plurality of mined query pairs,
- wherein training the statistical machine translation model comprises:
  - identifying a plurality of domain independent salient phrases (DISPs),
  - identifying a plurality of previously received natural language type queries that correspond to the plurality of DISPs to form corresponding DISPs,
  - associating at least one of the plurality of previously received natural language type queries with a previously received keyword-based type query based on the corresponding DISPs to form a mined query pair of the plurality of mined query pairs according to a uniform resource locator (URL) click graph, wherein the URL click graph comprises a weighted distribution of URLs selected in response to the plurality of previous natural language queries and the previously received keyword-based type query, and
  - extracting a plurality of common features for at least one of the mined query pairs;
- receiving a new search query from a user,
- determining whether the new search query comprises a new natural language type search query,
- in response to determining that the new search query comprises the new natural language type search query, mapping the new natural language type search query into a keyword-based type query according to the trained statistical machine translation model;
- performing a search query according to the keyword-based type query; and
- providing a plurality of results associated with the search query to the user.

\* \* \* \* \*